US008800126B2

(12) United States Patent
Shen

(10) Patent No.: US 8,800,126 B2
(45) Date of Patent: Aug. 12, 2014

(54) TOOL DEVICE FOR DISMANTLING JOINT

(76) Inventor: Wei Nan Shen, Taichung (TW)

(*) Notice: Subject to any disclaimer, the term of this patent is extended or adjusted under 35 U.S.C. 154(b) by 886 days.

(21) Appl. No.: 12/930,430

(22) Filed: Jan. 6, 2011

(65) Prior Publication Data

US 2012/0174363 A1 Jul. 12, 2012

(51) Int. Cl.
*B23P 19/04* (2006.01)
*B25B 27/067* (2006.01)

(52) U.S. Cl.
USPC .................................. 29/253; 29/257; 29/259

(58) Field of Classification Search
USPC ............................................ 29/253, 257, 259
See application file for complete search history.

(56) References Cited

U.S. PATENT DOCUMENTS 1,515,258 A * 11/1924 Langille ........................ 414/427
1,521,383 A * 12/1924 Maas .............................. 29/256
1,890,686 A * 12/1932 Kehr .............................. 29/260
3,846,891 A * 11/1974 Elg ................................ 29/261
4,463,489 A * 8/1984 James ............................. 29/259
4,893,395 A * 1/1990 Crowder ......................... 29/259
5,140,736 A * 8/1992 Hsiao ......................... 29/243.54
5,148,590 A * 9/1992 Wu ................................. 29/257
5,586,378 A * 12/1996 Smith ............................. 29/257
5,713,117 A * 2/1998 Bliss ............................... 29/257
5,906,034 A 5/1999 Weisshaar
6,085,399 A * 7/2000 Fileccia .......................... 29/239
6,546,610 B2 4/2003 Klann
6,665,918 B1 * 12/2003 Williams ........................ 29/259
7,028,380 B2 * 4/2006 Donovan et al. ........... 29/402.01
7,272,886 B2 * 9/2007 Thomson ........................ 29/724
8,132,331 B1 * 3/2012 Rutherford ................ 29/898.08

FOREIGN PATENT DOCUMENTS

EP 2025474 A2 * 2/2009
EP 2163347 A2 * 3/2010

* cited by examiner

*Primary Examiner* — Lee D Wilson
*Assistant Examiner* — Alvin Grant
(74) *Attorney, Agent, or Firm* — Charles E. Baxley

(57) ABSTRACT

A tool device includes a lever having two screw holes, two arms each having an upper orifice for securing to the end portions of the lever, two rods attached to the arms for positioning two end ears of a housing of a universal joint to the arms, one or more screws engaged with the screw holes of the lever and adjustable relative to the lever, and each screw include a lower cavity for engaging with a stud, each stud include a tip for engaging with the slot that is formed between the end ears of the housing and for being forced to engage into the slot and to separate the end ears of the housing from each other and for allowing a bearing member to be removed from the housing.

10 Claims, 9 Drawing Sheets

TOOL DEVICE FOR DISMANTLING JOINT

BACKGROUND OF THE INVENTION

1. Field of the Invention

The present invention relates to a tool device, and more particularly to a tool device for dismantling or disengaging a roller or ball-shaped bearing member from a ball joint or universal joint or the like and for allowing the bearing member to be easily dismantled or disengaged from the ball joint or universal joint by the users themselves.

2. Description of the Prior Art

Typical ball joints or universal joints comprise a ball member rotatably received or engaged in a socket or housing. Normally, the socket or housing includes a solid structure for stably receiving the ball member and for preventing the ball member from being removed or disengaged from the socket or housing particularly when the ball member is rotated in a great speed relative to the socket or housing.

When the typical ball joints or universal joints have been damaged or when the ball member has been worn out, it will be difficult to remove or disengage the ball member from the socket or housing, particularly may not be easily removed or disengaged from the socket or housing by the users themselves. In addition, a number of different tool members or tool devices are required to be purchased and prepared to remove or disengage the ball member from the socket or housing.

For example, U.S. Pat. No. 5,906,034 to Weisshaar, and U.S. Pat. No. 6,546,610 to Klann disclose two of the typical devices for loosening a screw seated tightly in a mounting hole of a bearing eye or the like and comprise a support body for supporting the sockets or housings of the bearing eyes, and one or more spacer members for moving or separating the ears of the sockets or housings of the bearing eyes from each other and for removing or disengaging the ball member from the sockets or housings of the bearing eyes.

However, the sockets or housings of the bearing eyes may include different widths or thicknesses, and the support body may not be used for supporting the sockets or housings of the bearing eyes of different widths or thicknesses.

The present invention has arisen to mitigate and/or obviate the afore-described disadvantages of the conventional tool devices for removing or disengaging the bearing members from the sockets or housings.

SUMMARY OF THE INVENTION

The primary objective of the present invention is to provide a tool device for easily and quickly removing or disengaging the bearing members from the sockets or housings of the ball joints or universal joints when required.

The other objective of the present invention is to provide a tool device for easily and quickly removing or disengaging the bearing members from the sockets or housings of the ball joints or universal joints when the sockets or housings include two end ears of different sizes or dimensions or widths.

In accordance with one aspect of the present invention, there is provided a tool device for dismantling a bearing member from a housing of a universal joint which includes a slot formed therein for forming two end ears and which includes an opening formed through the end ears and communicative with the slot that is formed between the end ears of the housing, the tool device includes a lever having two end portions and having two screw holes formed therein, two arms each including an orifice formed in an upper portion thereof for slidably securing to the end portions of the lever, and each including an aperture formed in a lower portion thereof, two rods engaged with the apertures of the arms and each including two end portions for selectively engaging with the openings of the end ears of the housing and for positioning the arms to the end ears of the housing, two screws engaged with the screw holes of the lever and adjustable relative to the lever, and each screw including a cavity formed in a bottom portion thereof, and two studs engaged with the cavities of the screws respectively, and each including a tip for engaging with the slot that is formed between the end ears of the housing and for being forced to engage into the slot and to separate the end ears of the housing from each other, and thus for allowing the bearing member to be removed and disengaged from the housing.

The screws each include a non-circular end portion provided thereon for being engaged with a driving member which may rotate the screw and the stud relative to the lever and the end ears of the housing.

Two fasteners may further be provided and engaged through the arms respectively and engaged with the lever for solidly securing the arms to the lever and for preventing the arms from being moved or adjusted relative to the lever.

The orifices of the arms are non-circular orifices for preventing the arms from being rotated relative to the lever. A gasket may further be provided and attached onto each of the studs and engaged between the screw and the stud for anchoring and positioning the stud to the screw.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
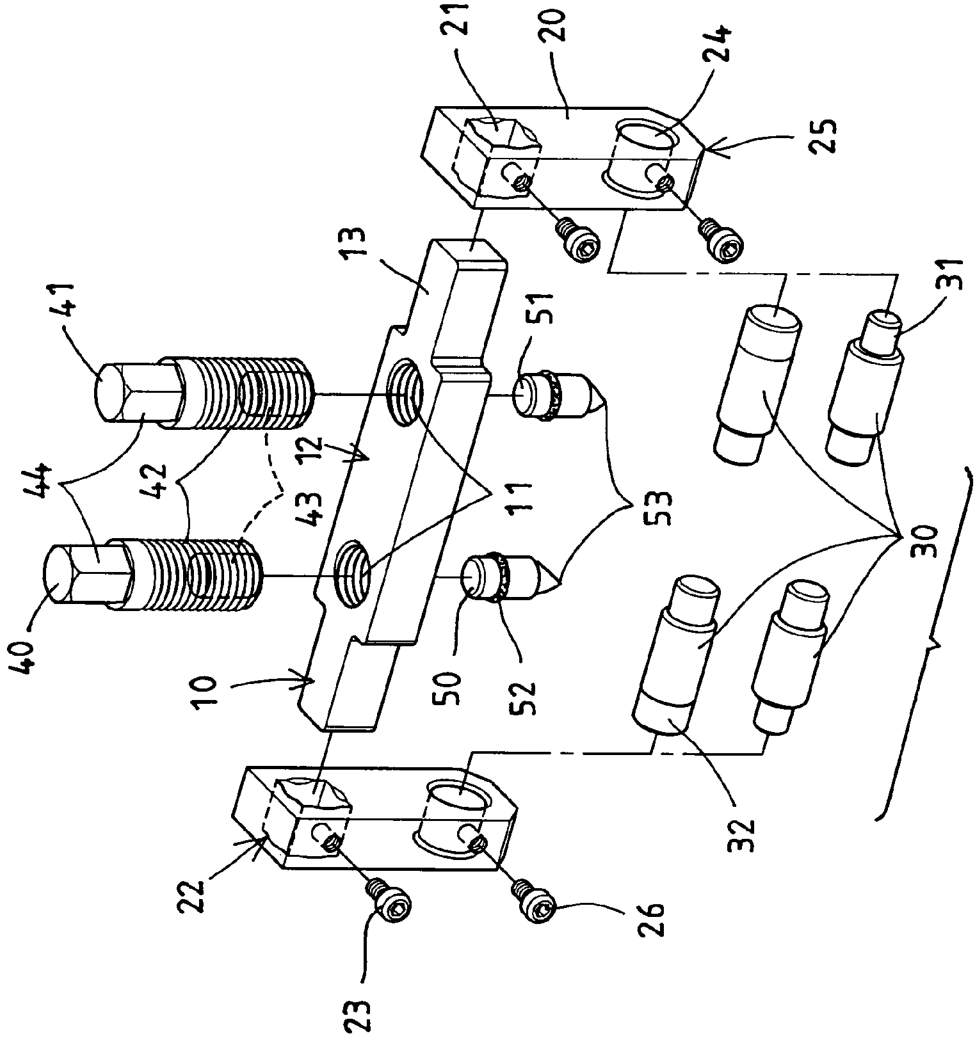
FIG. 1 is an exploded view of a tool device in accordance with the present invention.
Figure 2:
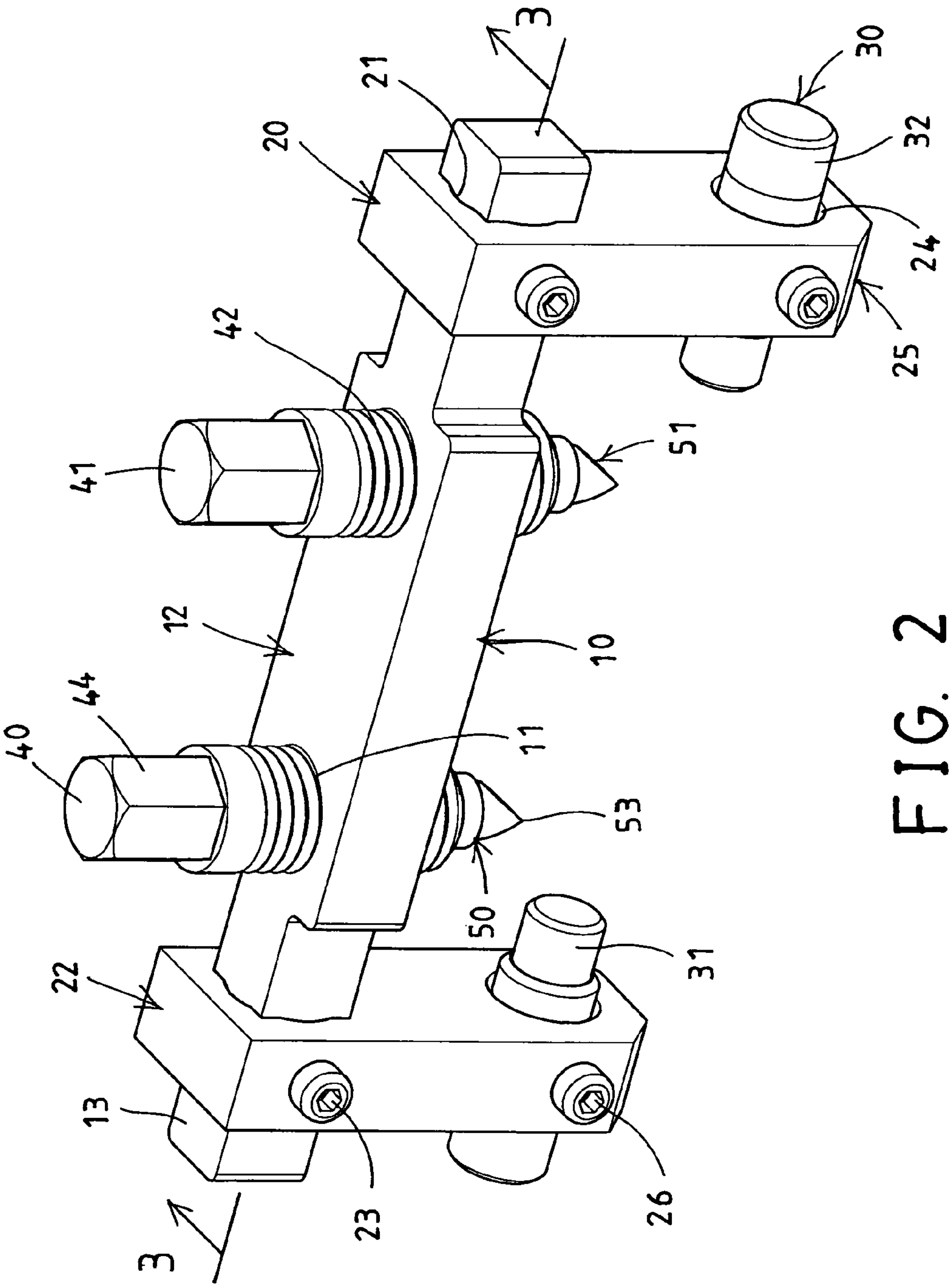
FIG. 2 is a perspective view of the tool device.
Figure 3:
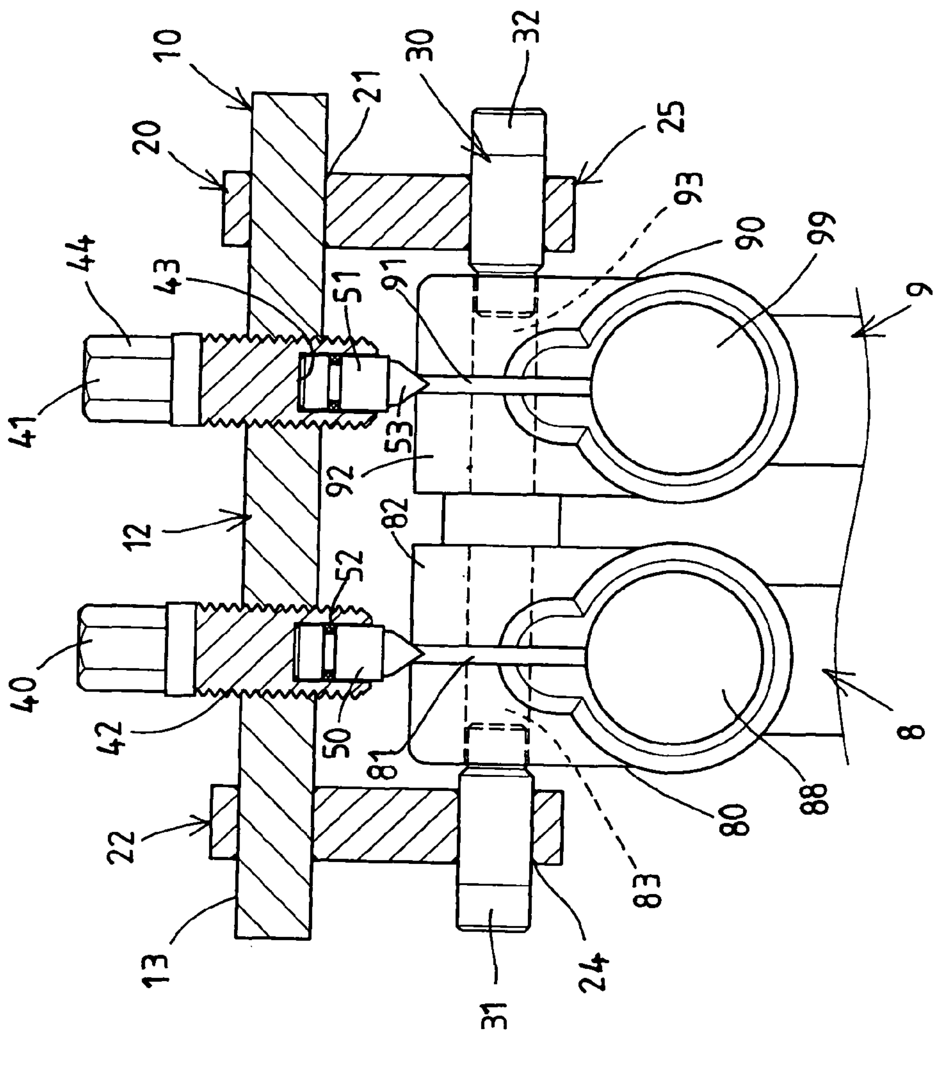
FIG. 3 is a partial cross sectional view of the tool device, taken along lines 3-3 of FIG. 2.

Referring to the drawings, and initially to FIGS. 1-3, a tool device in accordance with the present invention is provided for dismantling or disengaging one or more rollers or ball-shaped bearing members 88, 99 from one or more sockets or housings 80, 90 of one or more ball joints or universal joints 8, 9 each of which include a slot 81, 91 formed therein for forming two end ears 82, 92 and which includes an opening 83, 93 laterally formed through both of the end ears 82, 92 and intersecting or communicating with the slot 81, 91 that is formed between the end ears 82, 92 of the housing 80, 90, and the tool device is particularly provided for separating the end ears 82, 92 of the housing 80, 90 from each other and for allowing the bearing member 88, 99 to be removed or disengaged from the housing 80, 90.

The tool device comprises a lever 10 having one or more (such as two) screw holes 11 formed therein, such as formed in the middle portion 12 thereof, and having two end portions 13, and includes two arms 20 each having an orifice 21, such as a non-circular orifice 21 formed in the upper portion 22 thereof for slidably receiving the end portions 13 of the lever 10 and for preventing the arms 20 from being rotated relative to the lever 10 and for allowing the arms 20 to be moved or adjusted relative to the lever 10 (FIGS. 3-4) and to be suitably disposed or arranged beside the end ears 82, 92 of the housing 80, 90. Two fasteners 23 may be engaged through the upper portions 22 of the arms 20 and engaged with the end portions 13 of the lever 10 for solidly securing and positioning and retaining the arms 20 to the lever 10.

The arms 20 each further include an aperture 24 formed in the lower portion 25 thereof for slidably receiving a rod 30 therein, and a fastener 26 engaged through the lower portion 25 of the arm 20 and engaged with the rod 30 for solidly securing and positioning the rod 30 to the arm 20, the tool device may include one or more rods 30 having different end portions 31, 32 of different sizes or dimensions or diameters for selectively or changeably engaging with the openings 83, 93 of the end ears 82, 92 of the housing 80, 90 and for positioning or solidly securing or anchoring the arms 20 to the end ears 82, 92 of the housing 80, 90 and thus for positioning or retaining or coupling the lever 10 to the end ears 82, 92 of the housing 80, 90.

One or more (such as two) threaded members or bolts or screws 40, 41 includes an outer thread 42 for threading or engaging with the inner thread or screw hole 11 of the lever 10 and for moving or adjusting relative to the lever 10, and includes a cavity 43 formed in the lower or bottom portion thereof for changeably receiving or engaging with a stud 50, 51, and includes a non-circular end portion 44 for being engaged with a driving member (not shown) which may rotate the screw 40, 41 and the stud 50, 51 relative to the lever 10 and the end ears 82, 92 of the housing 80, 90. A resilient gasket 52 may be provided and attached or engaged onto each of the studs 50, 51 for engaging with or between the screw 40, 41 and the stud 50, 51 and for frictionally anchoring and positioning or retaining the studs 50, 51 to the screw 40, 41.

The studs 50, 51 each include a cone or tapered tip 53 for engaging with the slot 81, 91 that is formed between the end ears 82, 92 of the housing 80, 90 and for being forced to engage into the slot 81, 91 and to separate the end ears 82, 92 of the housing 80, 90 from each other and for allowing the bearing member 88, 99 to be removed or disengaged from the housing 80, 90. The arms 20 may be moved or adjusted relative to the lever 10 (FIGS. 3-4) for being suitably disposed or arranged beside the end ears 82, 92 of the housing 80, 90 of different sizes or dimensions or widths. The tips 53 or the studs 50, 51 of the tool device may include different shapes or sizes or dimensions or diameters for selectively or changeably engaging with the cavity 43 of the screw 40, 41 and for selectively engaging with the end ears 82, 92 of the housing 80, 90 of different sizes or dimensions or widths.

Figure 4:
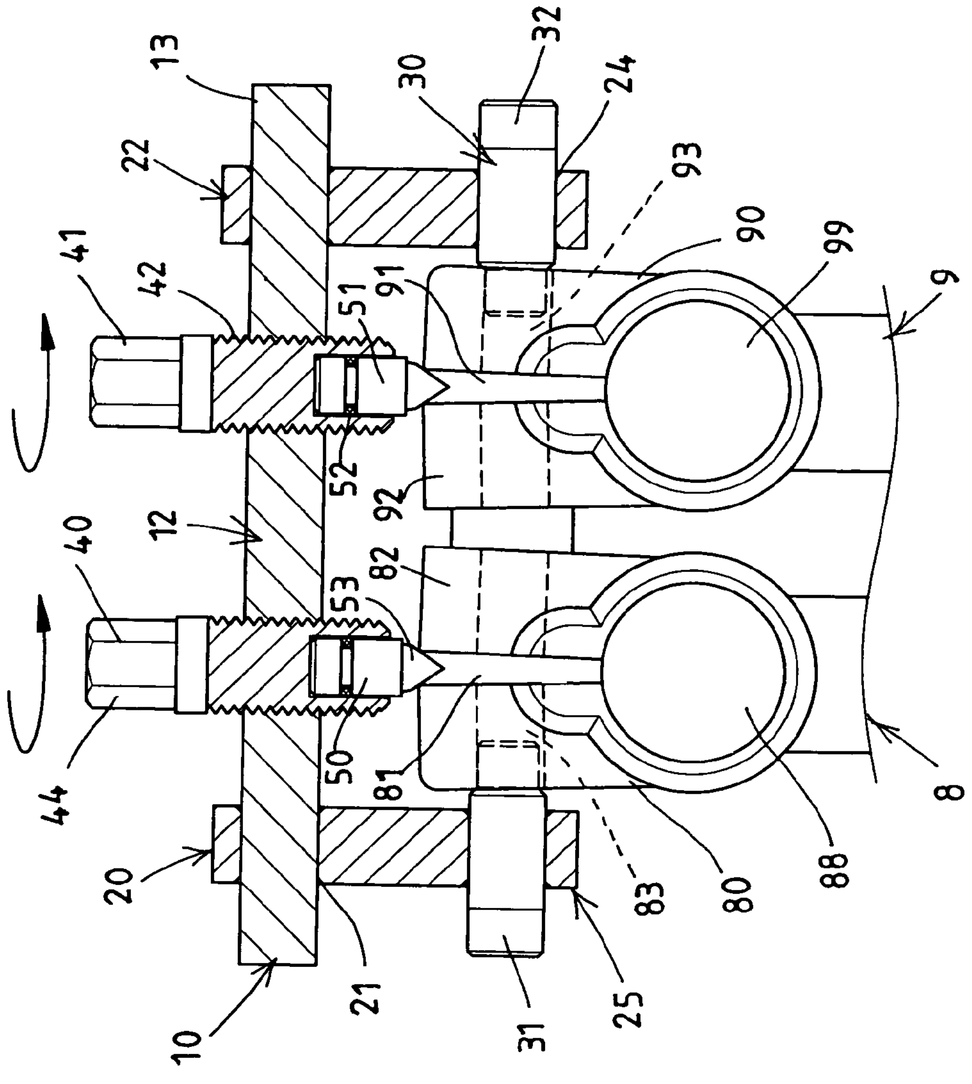
FIG. 4 is a partial cross sectional view similar to FIG. 3, illustrating the operation of the tool device.
Figure 5:
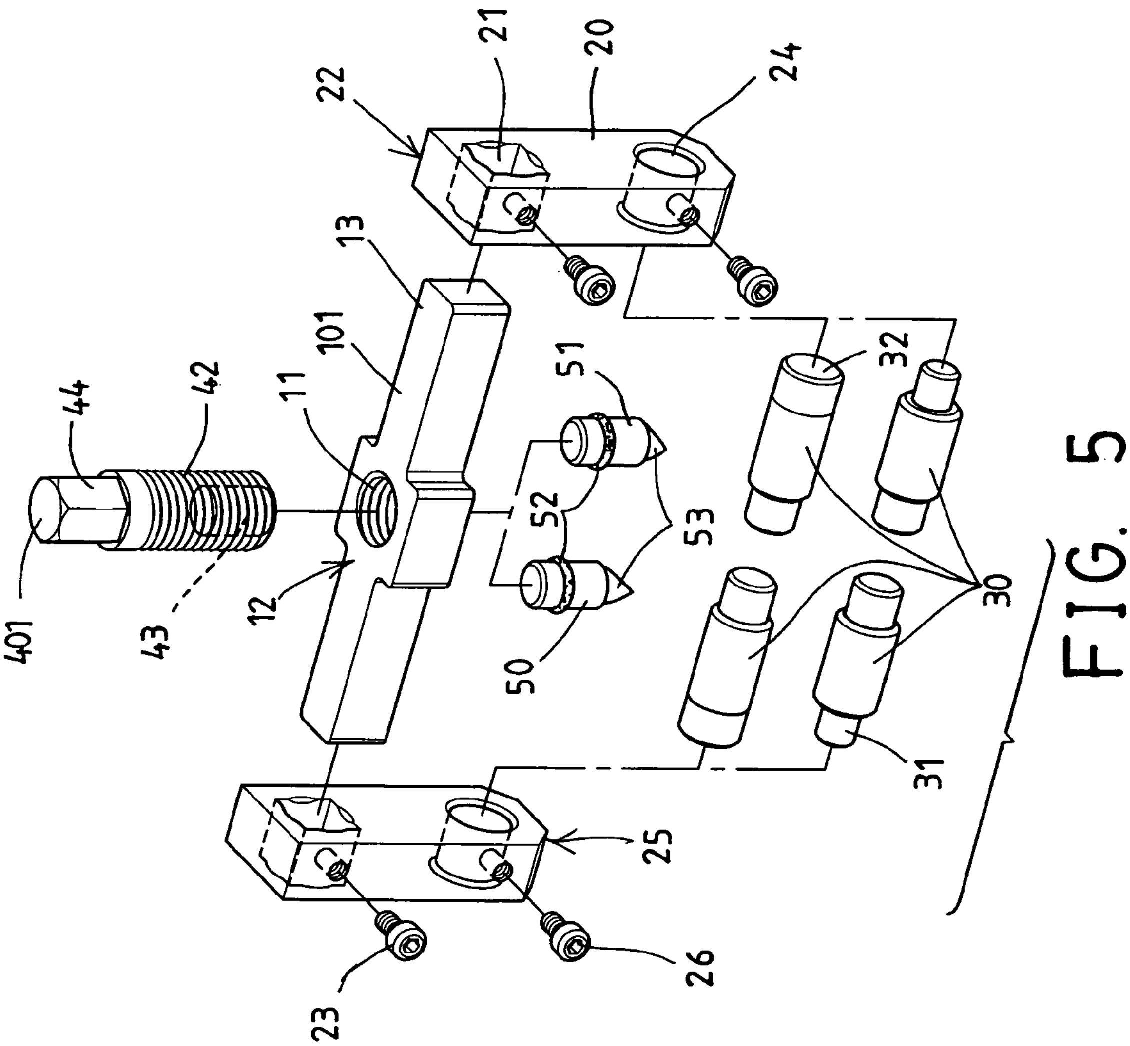
FIG. 5 is another exploded view similar to FIG. 1, illustrating the other arrangement of the tool device.
Figure 6:
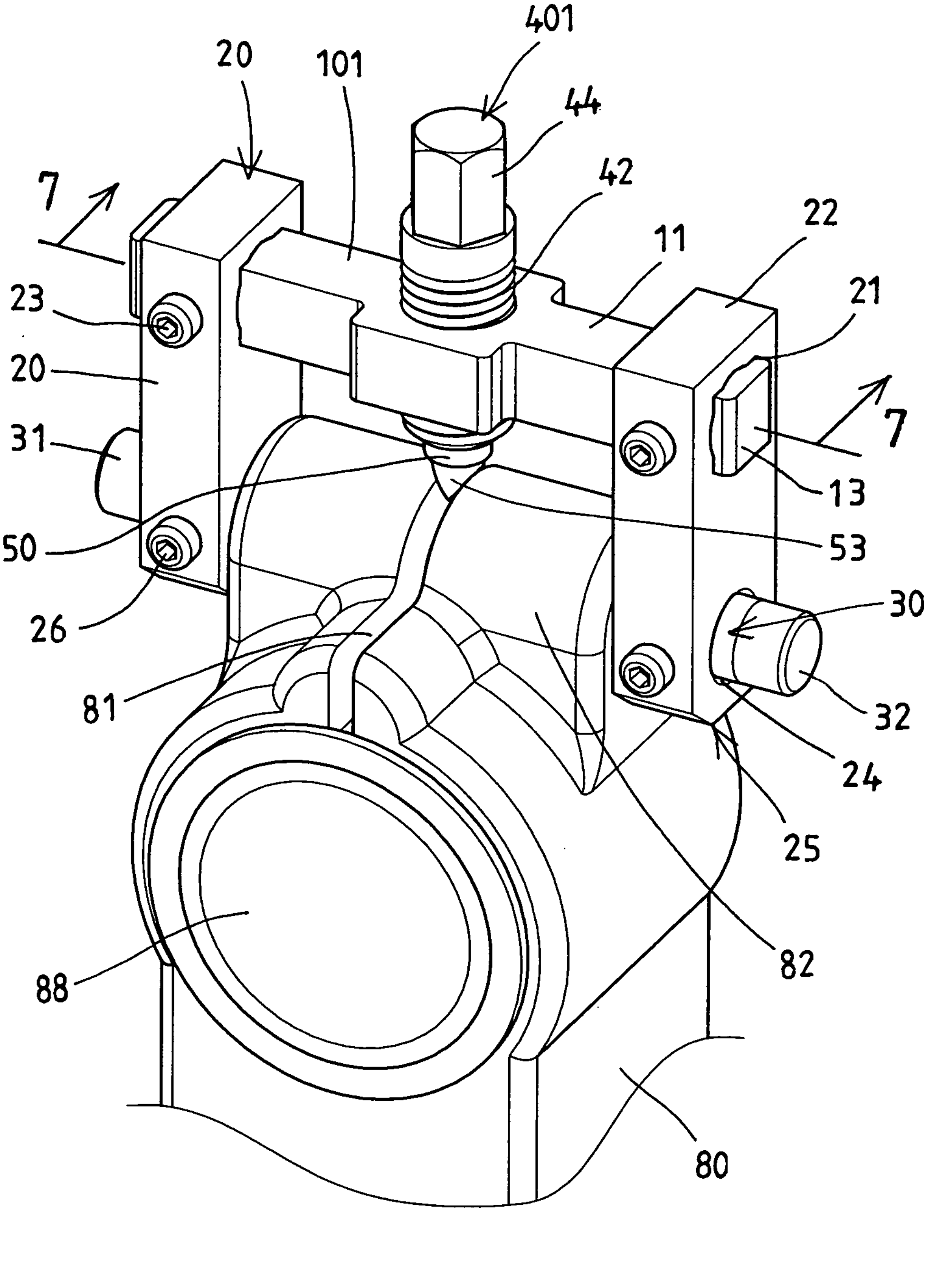
FIG. 6 is a partial perspective view illustrating the operation of the tool device as shown in FIG. 5.
Figure 7:
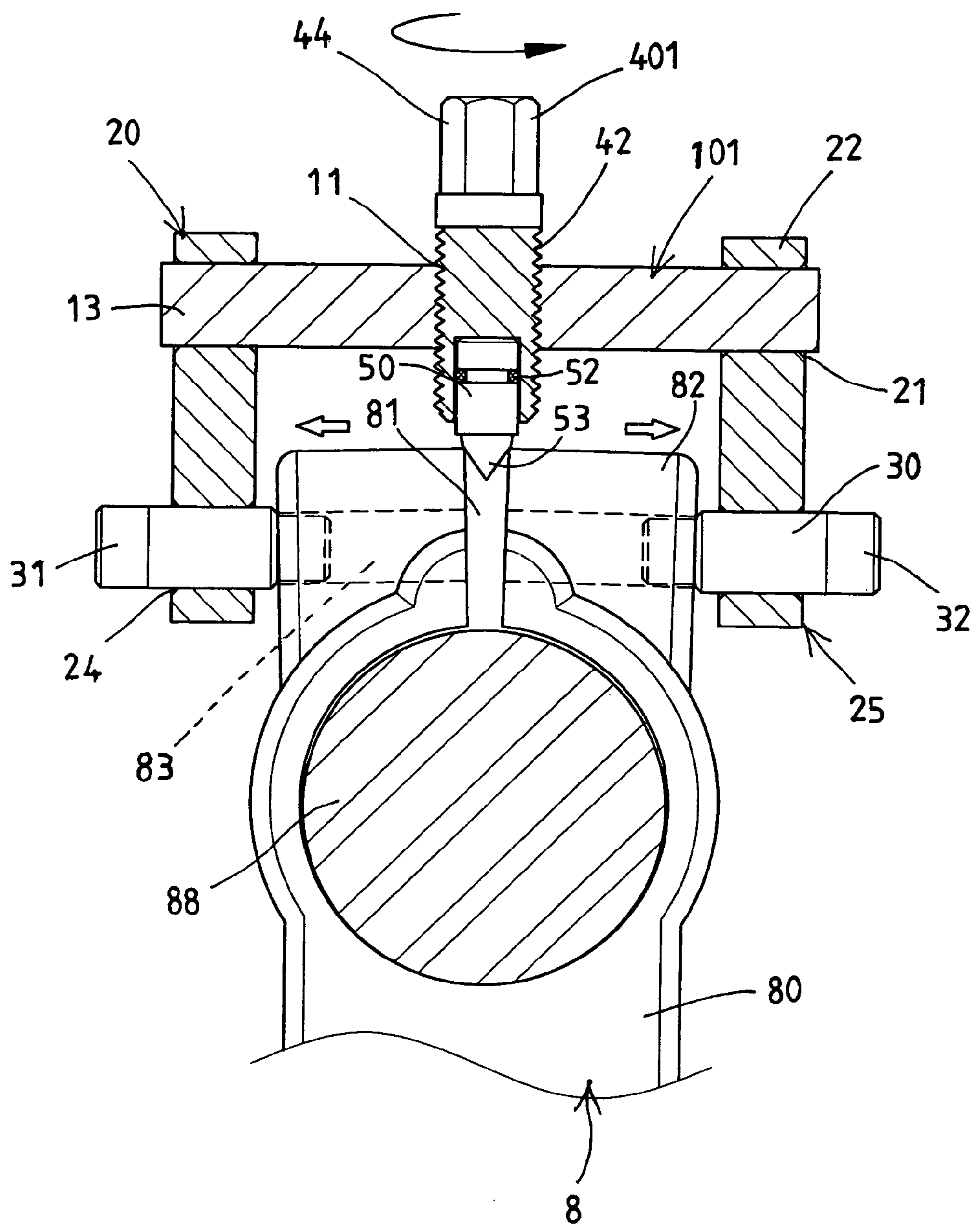
FIG. 7 is a partial cross sectional view of the tool device, taken along lines 7-7 of FIG. 6.
Figure 8:
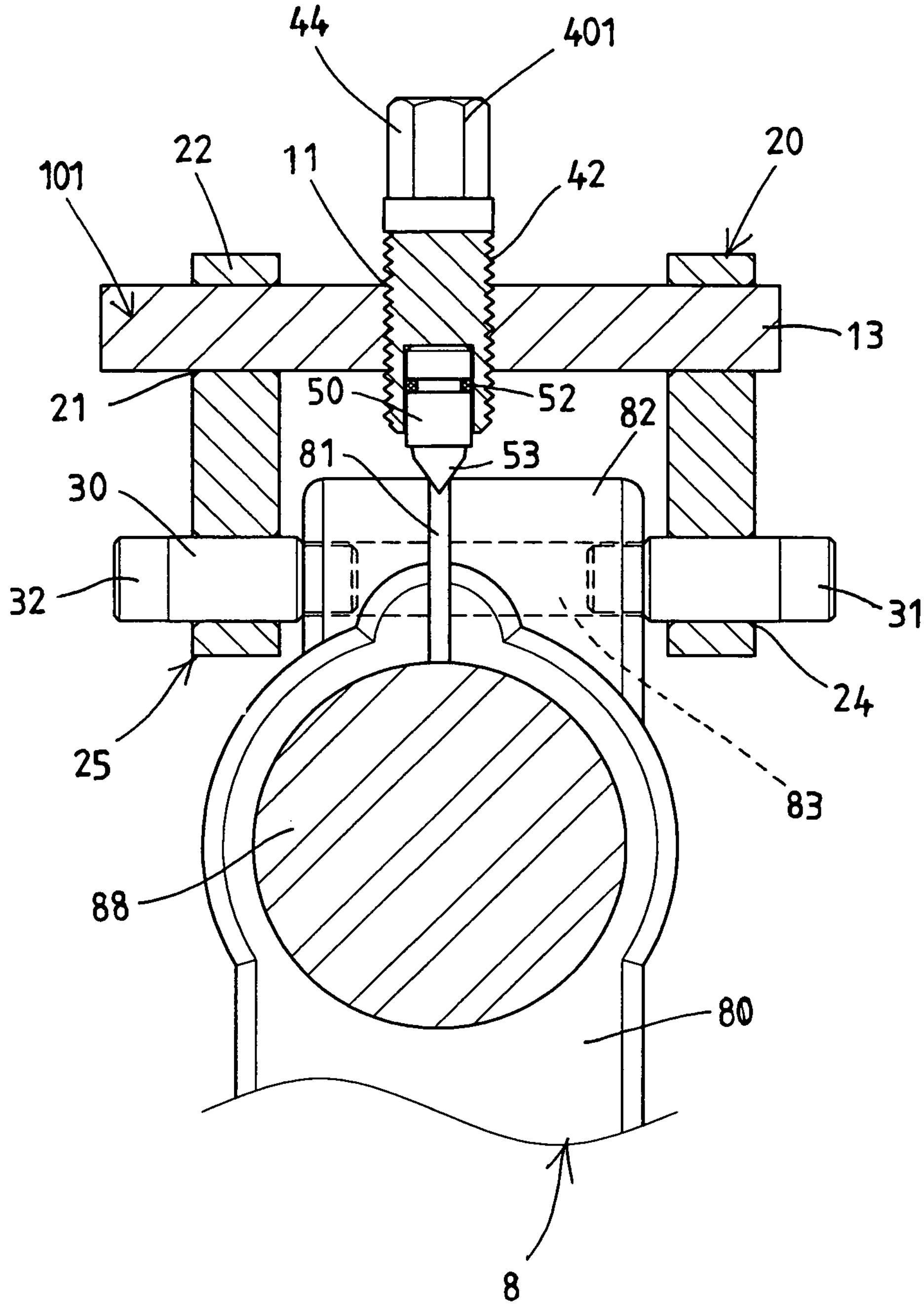
FIG. 8 is a partial cross sectional view similar to FIG. 7, illustrating the operation of the tool device.
Figure 9:
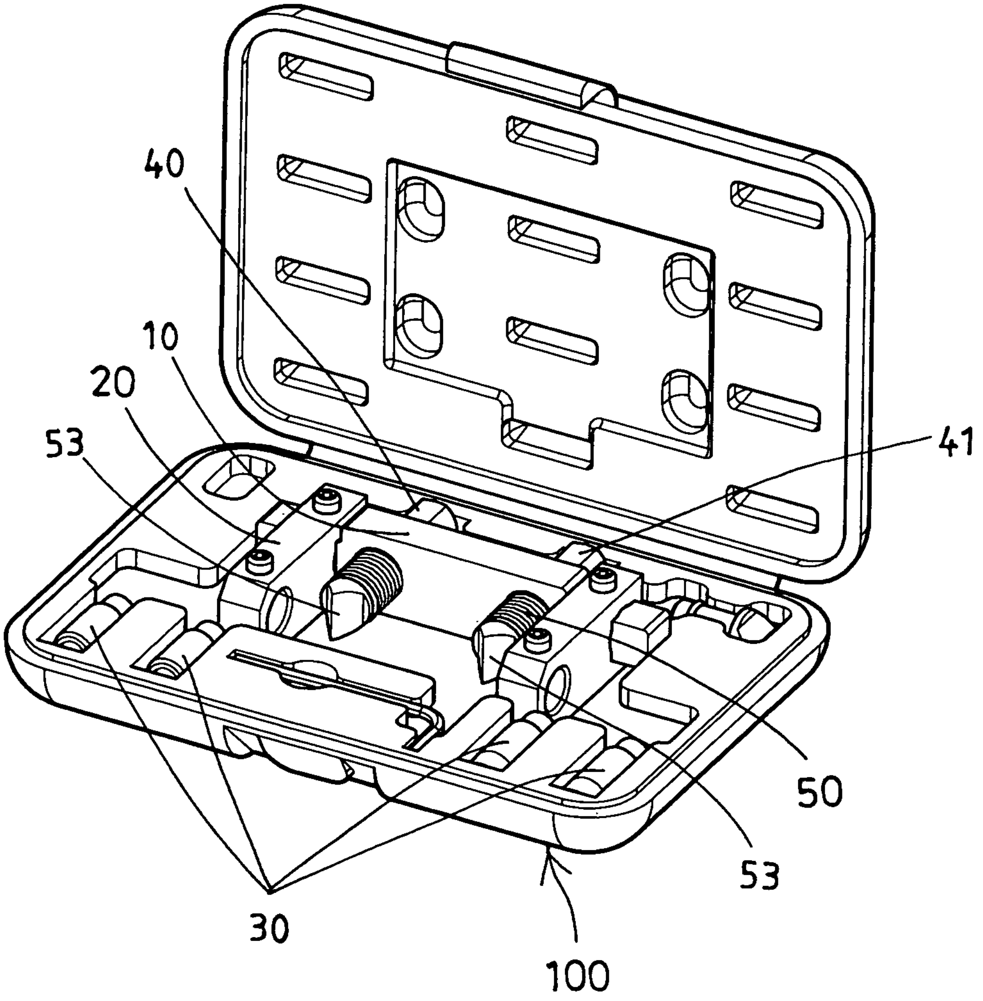
FIG. 9 is a perspective view illustrating the receptacle for receiving or accommodating the tool device.

In operation, as shown in FIGS. 3 and 4, the screw 40, 41 may be rotated relative to the lever 10 to force the tapered tip 53 of the stud 50, 51 into the slot 81, 91 that is formed between the end ears 82, 92 of the housing 80, 90 and to force the tapered tip 53 of the stud 50, 51 to engage with or into the slot 81, 91 that is formed between the end ears 82, 92 of the housing 80, 90 and to separate the end ears 82, 92 of the housing 80, 90 from each other (FIG. 4), when the end ears 82, 92 of the housing 80, 90 are separated from each other, the bearing member 88, 99 may be removed or disengaged from the housing 80, 90. As shown in FIG. 9, a container or receptacle 100 may further be provided for receiving or accommodating the parts or elements the tool device, such as the lever 10, the arms 20, the rods 30, the screws 40, 41, and the studs 50, 51, etc.

Alternatively, as shown in FIGS. 5-8, the lever 101 may include a single screw hole 11 formed therein, such as formed in the middle portion 12 thereof for threading or engaging with the outer thread 42 of the screw 401 which includes a cavity 43 formed in the lower or bottom portion thereof for selectively or changeably receiving or engaging with either of the studs 50, 51, in which the tips 53 or the studs 50, 51 of the tool device may include different shapes or sizes or dimensions or diameters for selectively or changeably engaging with the cavity 43 of the screw 401 and for selectively engaging with the end ears 82 of the housing 80 of different sizes or dimensions or widths.

Accordingly, the tool device in accordance with the present invention may be provided for easily and quickly removing or disengaging the bearing members from the sockets or housings of the ball joints or universal joints when required, or when the sockets or housings include two end ears of different sizes or dimensions or widths.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool device for dismantling a bearing member from a housing of a universal joint which includes a slot formed therein for forming two end ears and which includes an opening formed through the end ears and communicative with the slot that is formed between the end ears of the housing, said tool device comprising:

a lever including two end portions and including at least one screw hole formed therein, two arms each including an orifice formed in an upper portion thereof for slidably securing to said end portions of said lever, and each including an aperture formed in a lower portion thereof, two rods engaged with said apertures of said arms and each including two end portions for selectively engaging with the openings of the end ears of the housing and for positioning said arms to the end ears of the housing, at least one screw engaged with said at least one screw hole of said lever and adjustable relative to said lever, and including a cavity formed in a bottom portion thereof, and at least one stud engaged with said cavity of said at least one screw, and including a tip for engaging with the slot that is formed between the end ears of the housing and for being forced to engage into the slot and to separate the end ears of the housing from each other and for allowing the bearing member to be removed and disengaged from the housing.

2. The tool device as claimed in claim 1, wherein said at least one screw includes a non-circular end portion.

3. The tool device as claimed in claim 1, wherein two fasteners are engaged through said arms respectively and engaged with said lever for securing said arms to said lever.

4. The tool device as claimed in claim 1, wherein said orifices of said arms are non-circular orifices.

5. The tool device as claimed in claim 1, wherein a gasket is attached onto said at least one stud and engaged between said at least one screw and said at least one stud, for anchoring and positioning said at least one stud to said at least one screw.

6. A tool device for dismantling a bearing member from a housing of a universal joint which includes a slot formed therein for forming two end ears and which includes an opening formed through the end ears and communicative with the slot that is formed between the end ears of the housing, said tool device comprising:

a lever including two end portions and including two screw holes formed therein, two arms each including an orifice formed in an upper portion thereof for slidably securing to said end portions of said lever, and each including an aperture formed in a lower portion thereof, two rods engaged with said apertures of said arms and each including two end portions for selectively engaging with the openings of the end ears of the housing and for positioning said arms to the end ears of the housing, two screws engaged with said screw holes of said lever and adjustable relative to said lever, and each screw including a cavity formed in a bottom portion thereof, and two studs engaged with said cavities of said screws respectively, and each including a tip for engaging with the slot that is formed between the end ears of the housing and for being forced to engage into the slot and to separate the end ears of the housing from each other and for allowing the bearing member to be removed and disengaged from the housing.

7. The tool device as claimed in claim 6, wherein said screws each include a non-circular end portion.

8. The tool device as claimed in claim 6, wherein two fasteners are engaged through said arms respectively and engaged with said lever for securing said arms to said lever.

9. The tool device as claimed in claim 6, wherein said orifices of said arms are non-circular orifices.

10. The tool device as claimed in claim 6, wherein a gasket is attached onto each of said studs and engaged between said screw and said stud for anchoring and positioning said stud to said screw.

* * * * *